Feb. 13, 1962 R. KLOSS 3,020,903
AIR COMPRESSING FUEL INJECTION INTERNAL COMBUSTION ENGINE
Filed April 28, 1960 2 Sheets-Sheet 1
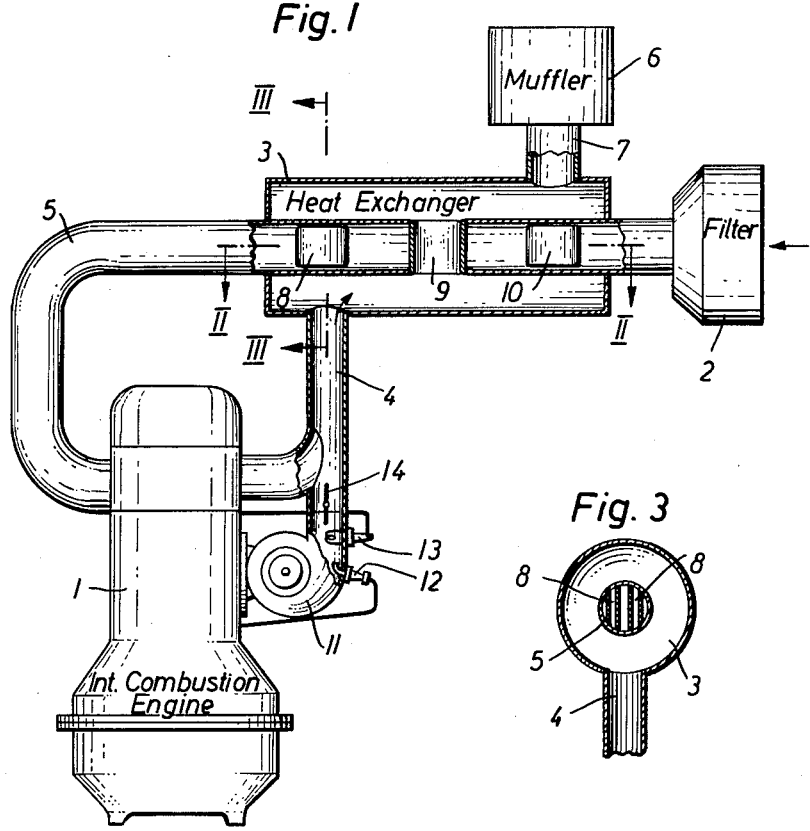
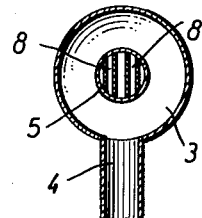
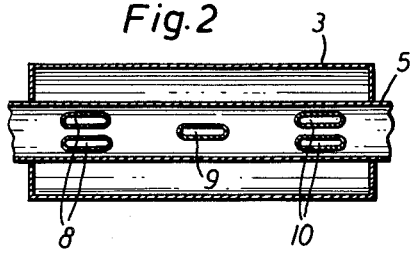
INVENTOR
Richard Kloss
BY
Walter Becker
Patent Agent Feb. 13, 1962  R. KLOSS  3,020,903
AIR COMPRESSING FUEL INJECTION INTERNAL COMBUSTION ENGINE
Filed April 28, 1960  2 Sheets-Sheet 2
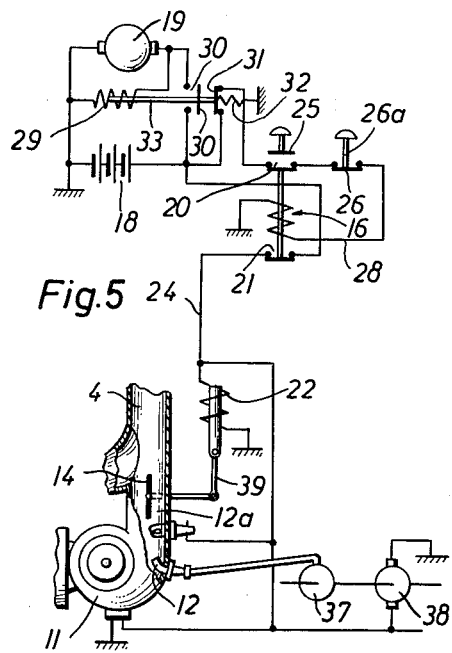
Fig.5
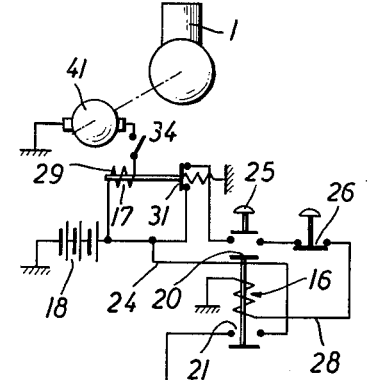
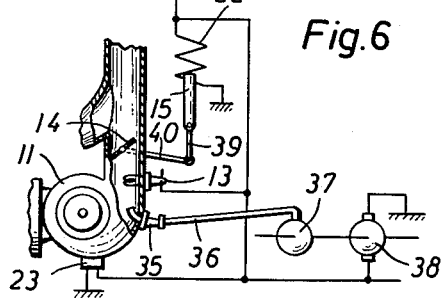
Fig.6
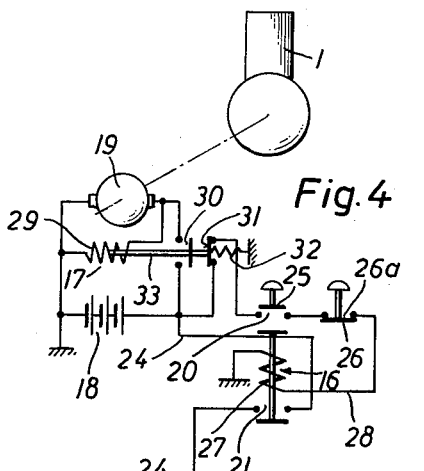
Fig.4
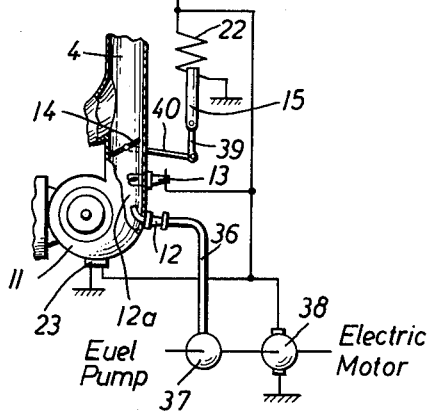
INVENTOR
Richard Kloss
BY
Patent Agent

United States Patent Office 3,020,903
Patented Feb. 13, 1962

3,020,903
AIR COMPRESSING FUEL INJECTION INTERNAL COMBUSTION ENGINE
Richard Kloss, Koln-Buchforst, Germany, assignor to Klockner-Humboldt-Deutz Aktiengesellschaft, Koln, Germany
Filed Apr. 28, 1960, Ser. No. 25,322
Claims priority, application Germany Dec. 6, 1957
7 Claims. (Cl. 123—142.5)

The present invention relates to an air-compressing fuel injection internal combustion engine and, more particularly, to such engine provided with a heat exchanger heated by exhaust gases for heating the combustion air fed into the engine. This is a continuation-in-part application of my copending application Ser. No. 777,520, filed December 1, 1958, now abandoned.

With air-compressing fuel injection internal combustion engines, the heating of the drawn-in combustion air reduces the ignition lag. This is particularly welcome with such air-compressing engines which are intended at the same combustion ratio to work with easily ignitable fuels as well as with fuels which are difficult to ignite.

It is an object of the present invention to provide means which will facilitate the starting of such engines.

It is also an object of this invention to provide an arrangement for use in connection with air-compressing fuel injection internal combustion engines of the above mentioned type which will considerably facilitate the starting of such engines also when such engines are to be actuated with fuels relatively difficult to ignite.

It is still another object of this invention to provide start facilitating means for an internal combustion engine which as general equipment comprises a heat exchanger adapted in a continuous manner to heat up the intake air by means of the exhaust gases from said engine. More specifically, it is an object to pre-heat the intake air in the intake manifold of an engine of the just mentioned type prior to the start of said engine.

These and other objects and advantages of the invention will appear more clearly from the following specification in connection with the accompanying drawing, in which:

FIG. 1 diagrammatically illustrates an air-compressing fuel injection internal combustion engine with a heat exchanger heated by exhaust gases for heating the combustion air to be supplied to the engine.

FIG. 2 represents a diagrammatic horizontal section through the heat exchanger of FIG. 1, said section being taken along the line II—II of FIG. 1.

FIG. 3 represents a section along the line III—III of FIG. 1.

FIG. 4 diagrammatically illustrates a control circuit adapted automatically after starting the internal combustion engine to turn off the source of heating gas, the system shown in FIG. 4 being shown in its inoperative position.

FIG. 5 represents the system of FIG. 4 in operative position.

FIG. 6 is a control circuit slightly modified over that of FIG. 4 for the same purpose as the latter.

*General arrangement*

In conformity with the present invention, the air-compressing fuel injection internal combustion engine which is provided with a heat exchanger for pre-heating the combustion air, is equipped with a source of heating gas connected to the exhaust manifold so that heating gas from said source will be able, prior to starting the engine, to heat up that section of the intake manifold which is located within the heat exchanger. More specifically, air furnished e.g. by a blower and heated up by heating means is passed into said heat exchanger. In this way, the air in that portion of the intake manifold which is surrounded by said heat exchanger is heated up and is stored in said intake manifold. After this has been accomplished, the engine will be started. It will be appreciated that in this way the engine to be started will already during its start take in hot combustion air and, consequently, will ignite and start easier due to the increased compression temperatures brought about by the pre-heating of the combustion air.

While it is known with air-compressing fuel injection internal combustion engines to heat up the intake system, the pre-heating of the combustion air in conformity with the present invention has an increased effect in so far as the added heat is stored in a structural element which the machine has anyhow and which is sturdy and has a high heat absorption ability, namely in the heat exchanger.

The connection of the source of heating gas with the exhaust manifold has the particular advantage that any desired or available gas may be employed for pre-heating the air prior to the starting of the engine, inasmuch as the said heating gas will not enter the working chambers of the cylinder. In other words, instead of pure hot air, also combustion gases can be employed as they are formed when combusting a fluid or gaseous fuel. Furthermore, the heating gases will be exhausted by the exhaust manifold.

In conformity with the present invention, the source of heating gas may be disconnected from the exhaust manifold as soon as the engine has been started so as to prevent soiling of the source of heating gas by the exhaust gases of the engine. This disconnection may be brought about by an element which is simple to operate such as a shut-off valve or by an element which will be automatically closed by a certain pressure of the exhaust gases, for instance a check valve. The source of heating gas may be designed in any convenient manner.

According to a further development of the invention, the source of heating gas may consist of a blower adapted to draw in air from the surrounding area, and a heating device through which the air furnished by the blower will pass. The heating device may be of any convenient or suitable design. In many instances it will be expedient to employ a burner arranged in the pressure conduit of the blower and adapted to be operated with fuel intended for operating the engine. If it is desired to effect the pre-heating of the combustion air by means of pure hot air, indirect heating will be advisable.

According to a further feature of the invention, the drive for the blower, if desired also the actuating mechanism for the shut-off device for the heating means may be coupled to each other in such a way that when the blower is turned on, automatically the shut-off element will move into its open position and the heating system will be made effective. Furthermore, the actuating means for the source of hot gas may be coupled to the starter of the engine in such a way that the source of heating gas will automatically turn off when the engine has started.

*Structural arrangement*

Referring now to the drawings in detail, the arrangement shown therein comprises an internal combustion engine 1 to which the combustion air is supplied through a filter 2. The air taken in through the filter 2 is passed through a heat exchanger 3 surrounding a portion of the intake manifold 5. It will be appreciated that when the heat exchanger 3 is effective, the air passing from the filter 2 into the intake manifold 5 through heat exchanger 3 will be heated. The exhaust gases of the engine are conveyed to the heat exchanger 3 through the manifold 4 and are discharged through a conduit 7 leading to the muffler 6. For purposes of increasing the heat exchanging surface, pipe sections 8, 9 and 10 pressed into a more or less flat shape are inserted in that section of the intake manifold 5 which is located within the heat exchanger 3. Said pipe sections 8, 9 and 10 are passed through by the exhaust gases of the engine. The number and shape of these pipe sections are more clearly shown in FIG. 2.

Connected to the manifold 4 is a source of heating gas which is adapted to be disconnected from the heat exchanger by means of a throttle valve 14. The said source of heating gas consists of a blower 11 adapted to draw in air from the surroundings, and a burner interposed between said blower 11 and the heat exchanger 3. The said burner comprises an injection nozzle 12 which may be fed with the same fuel which is intended for operating the engine, and also comprises an electric ignition device 13 directly adjacent said nozzle 12. This source of hot air makes it posssible to preheat the intake manifold prior to the starting of the engine thereby facilitating the starting of the engine.

According to a further feature of the invention, means may be provided which will bring about that the auxiliary source of heating gas will automatically be made ineffective after the engine has started. Such an arrangement is shown in FIG. 4. FIG. 4 shows at the lower portion on a somewhat reduced scale the auxiliary heating source of FIG. 1, namely the blower 11, which may be driven for instance by an electric motor 38, a fuel injection nozzle 12 extending into the pressure conduit 12a of the blower 11, a spark plug or glow plug 13 likewise extending into the pressure conduit 12a, and a throttle 14 in said pressure conduit 12a. The throttle 14 which, when the device of FIG. 4 is in its inoperative condition, occupies its closed postion, shown in FIG. 4, is operable by a link system 39, 40 which in its turn is connected to a lifting magnet 15 operable by a coil 22 forming part of a circuit which will be described further below. The mechanical part of the system in FIG. 4 furthermore comprises a fuel line 36 having one end connected to a fuel pump 37 which in turn may be driven by an electric motor 38 for feeding a fuel to the injection nozzle 12. This fuel represents a burnable liquid adapted to be ignited by the spark plug or glow plug 13 which, as shown in FIGS. 1 and 4, is interposed between the throttle 14 and the blower 11.

The electric circuit for controlling the operation of the lifting magnet 15 comprises a battery 18, two control relays 16 and 17, and a generator 19 drivingly connected to the engine 1. The armature of relay 16 is adapted to control two switches 20 and 21 so that these switches will be in open position when said relays are de-energized as shown in FIG. 4. Switch 21 controls a feeding line 24 which leads from battery 18 to coil 22 of the lifting magnet 15 and to glow plug 13 and furthermore to the terminals 23 of the electric motor drivingly connected to the blower 11. Line 24 also is connected to the drive motor 38 for pump 37. Switch 20 is adapted to be closed by a hand operable switch blade 25 whenever desired and is arranged in a line 28 leading from battery 18 to coil 27 of relay 16. Switch 20 is in series with a likewise manually operable switch blade 26a. Coil 29 of relay 17 is connected directly to the terminals of the generator 19.

The operation of the control circuit of FIG. 4 is as follows. When the control arrangement is in its inoperative position as shown in FIG. 4, namely prior to the starting of the heating device, switch blade 26a and switch 31 are closed whereas switches 20, 21 and 30 are open, because the relays 16 and 17 are de-energized. Inasmuch as at this time, also the coil 22 governing the lifting magnet 15 is de-energized, magnet 15 is in its lower position so that throttle 14 in conduit 12a, which is connected to the exhaust manifold 4, is in its closed position thereby interrupting for all practical purposes communication between the blower 11 and the exhaust manifold 4.

If the engine 1 is now to be started, first manually operable switch blade 25 is temporarily depressed so as to close switch 20. Switch blade 25 has in customary manner associated there with a spring (not shown) which opens switch blade 25 after the hand releases the same. Due to the closure of switch 20, the energizing circuit for relay 16 is closed so that current passes from battery 18 through coil 27 of relay 16 controlling the opening and closing of switches 20 and 21. Relay 16 will then be energized and will close switch 20 and switch 21. In view of the closure of switch 21, current from battery 18 also passes through coil 22 of the lifting magnet 15 and further to glow plug 13, the terminals 23 of the drive motor 38 for blower 11 and to drive motor 38 for pump 37 feeding the injection nozzle 12. Thus, the lifting magnet 15 will be attracted and will move throttle 14 into its opening position as shown in FIG. 5. At the same time, glow plug 13 will glow, and blower 11 and pump 37 will start operation. The heating system will therefore be in full operation. The fuel injected by nozzle 12 will mix with the air delivered by blower 11. The thus formed mixture is ignited by the glow plug 13, and the hot gases will through exhaust manifold 4 be conveyed to the heat exchanger to be heated. FIG. 5 shows the heating system in operative condition.

After the heat exchanger has been heated up for a sufficient time, the internal combustion engine 1 will be started. With increasing speed of engine 1, also the voltage at the terminals of the generator 19 drivingly connected to engine 1 will increase. When this voltage has reached a certain value, relay 17 will be energized as a result of which switch 31 will be opened, while switch 30 will be closed. In view of the opening of switch 31, the coil 27 of relay 16 will suddenly be de-energized so that the armature of this relay returns to the position shown in FIG. 4 in which the switches 20 and 21 are open. The opening of these two switches breaks the energizing circuit for coil 22 of the lifting magnet 15 and also for glow plug 13 and the driving motor for blower 11 as well as the energizing circuit for motor 38 driving pump 37. Throttle 14, therefore, returns to its closing position shown in FIG. 4, glow plug 13 dies, and blower 11 and pump 37 come to a standstill. In view of the closure of switch 30, battery 18 will be connected to the terminals of generator 19 and will be charged by the latter.

When the engine 1 has stopped, coil 29 of relay 17 will become de-energized so that the armature 33 of relay 17 will by means of tension spring 32 return to its starting position in which switch 30 is open and switch 31 will be closed. The entire arrangement has then returned to its previous position of readiness.

The arrangement of FIG. 6 differs from that of FIGS. 4 and 5 merely in that the generator 19 and the switch 30 of FIGS. 4 and 5 have been eliminated and in that in FIG. 6 the coil 29 of relay 17 is arranged in series with the starting motor 41 of the internal combustion engine and a switch 34 in a circuit supplied with electric energy by battery 18.

The turning off of the heating device will in this instance be brought about by closing switch 34. As soon as the internal combustion engine 1 has been started, relay 17 becomes energized and switch 31 will open with the described result.

It is, of course, to be understood that the present invention is, by no means, limited to the particular arrangement shown in the drawing but also comprises any modifications within the scope of the appended claims.

What I claim is:

1. In combination with an air compressing fuel injection engine having an intake manifold for taking in combustion air, and a discharge manifold for discharging combustion gases from said engine: heat exchanging means surrounding a portion of said intake manifold, said discharge manifold communicating with said heat exchanging means, hot gas supply means, conduit means adapted to establish communication between said hot gas supply means and said discharge manifold for preheating said portion of said intake manifold prior to starting said engine, and means arranged in said conduit means and operable selectively to establish or interrupt communication of said heat supply means with said heat exchanging means.

2. In combination with an air compressing fuel injection engine having an intake manifold for taking in combustion air, and a discharge manifold for discharging combustion gases from said engine: during operation thereof, a heat exchanger surrounding a portion of said intake manifold, said discharge manifold communicating with said heat exchanger, hot gas supply means including a blower adapted to draw in air of a temperature of the surrounding air and also including heating means for heating the air drawn in by said blower, and conduit means adapted to establish communication between said hot gas supply means and said discharge manifold for preheating said portion of said intake manifold prior to starting said engine.

3. In combination with an air compressing fuel injection engine having an intake manifold for taking in combustion air, and a discharge manifold for discharging combustion gases from said engine during the operation thereof: a single heat exchanger surrounding a portion of said intake manifold, said discharge manifold communicating with said heat exchanger, hot gas supply means including a burner operable by the same fuel employed for said engine, and conduit means adapted to establish communication between said hot gas supply means and said discharge manifold for preheating said portion of said intake manifold prior to starting said engine.

4. In combination with an air compressing fuel injection engine having an intake manifold for taking in combustion air, and a discharge manifold for discharging combustion gases from said engine: heat exchanging means surrounding a portion of said intake manifold, said discharge manifold communicating with said heat exchanging means, hot gas supply means including a blower adapted to draw in air of a temperature of the surrounding air and also including heating means for heating the air drawn in by said blower, conduit means adapted to establish communication between said hot gas supply means and said discharge manifold for preheating said portion of said intake manifold prior to starting said engine, control means arranged in said conduit means and operable to establish communication between said hot gas supply means and said heat exchanging means and also operable substantially to interrupt communication between said hot gas supply means and said heat exchanging means, switch means associated with said blower for selectively turning the same on or off, and means operatively connecting said switch means with said heating means and said control means to automatically make said heating means effective and to cause said control means to establish communication between said hot gas supply means and said heat exchanging means in response to the movement of said switch means into position for turning on said blower.

5. In combination with an air compressing fuel injection engine having an intake manifold for taking in combustion air, and a discharge manifold for discharging combustion gases from said engine: heat exchanging means surrounding a portion of said intake manifold, said discharge manifold communicating with said heat exchanging means, hot gas supply means including a blower adapted to draw in air of a temperature of the surrounding air and also including heating means for heating the air drawn in by said blower, conduit means adapted to establish communication between said hot gas supply means and said discharge manifold for preheating said portion of said intake manifold prior to starting said engine, control means arranged in said conduit means and operable to establish communication between said hot gas supply means and said heat exchanging means and also operable substantially to interrupt communication between said hot gas supply means and said heat exchanging means, switch means associated with said blower for selectively turning the same on or off, means operatively connecting said switch means with said heating means and said control means to automatically make said heating means effective and to cause said control means to establish communication between said hot gas supply means and said heat exchanging means in response to the movement of said switch means into position for turning on said blower, and means responsive to the starting of said engine for automatically making said hot gas supply means ineffective.

6. An air compressing fuel injection engine, which comprises: an intake manifold for taking in combustion air, a single heat exchanger arranged adjacent said intake manifold for conveying heat thereto, an exhaust gas discharging manifold communicating with said heat exchanger for conveying exhaust gases thereto to thereby heat said heat exchanger during operation of said engine, and hot gas supply means operable prior to starting said engine for conveying heating gases to said heat exchanger to heat the latter.

7. An arrangement according to claim 6, which includes electric control means electrically connected to said hot gas supply means and responsive to a certain speed of said engine for automatically making the latter ineffective.

References Cited in the file of this patent

UNITED STATES PATENTS

| | | |
|---|---|---|
| 1,387,848 | Good | Aug. 16, 1921 |
| 2,257,755 | Morici et al. | Oct. 7, 1941 |
| 2,561,467 | Gardner et al. | July 24, 1951 |